US011396625B2

(12) United States Patent
Saini et al.

(10) Patent No.: US 11,396,625 B2
(45) Date of Patent: Jul. 26, 2022

(54) COATED PROPPANT AND METHODS OF MAKING AND USE THEREOF

(71) Applicant: Saudi Arabian Oil Company, Dhahran (SA)

(72) Inventors: Rajesh Kumar Saini, Cypress, TX (US); Mohammad Haque, Katy, TX (US); Mohammed Sayed, Houston, TX (US)

(*) Notice: Subject to any disclaimer, the term of this patent is extended or adjusted under 35 U.S.C. 154(b) by 192 days.

(21) Appl. No.: 16/573,511

(22) Filed: Sep. 17, 2019

(65) Prior Publication Data

US 2021/0079294 A1 Mar. 18, 2021

(51) Int. Cl.
*C09K 8/80* (2006.01)
*C08G 18/18* (2006.01)
(Continued)

(52) U.S. Cl.
CPC .......... *C09K 8/805* (2013.01); *C08G 18/1808* (2013.01); *C08G 18/2885* (2013.01); *C08G 18/542* (2013.01); *C08G 18/588* (2013.01); *C08G 18/65* (2013.01); *C08G 18/7664* (2013.01); *C09D 175/12* (2013.01); *C09K 8/62* (2013.01); *E21B 43/267* (2013.01)

(58) Field of Classification Search
CPC ...... C09K 8/805; C09K 8/62; C08G 18/1808; C08G 18/2885; C08G 18/542; C08G 8/588; C08G 18/65; C08G 18/7664; E21B 43/267; C09D 175/12
See application file for complete search history.

(56) References Cited

U.S. PATENT DOCUMENTS 6,001,923 A 12/1999 Moncur et al.
6,891,013 B1 5/2005 Malik et al.
(Continued)

FOREIGN PATENT DOCUMENTS

CN 103849373 B 8/2016
RO 98882 B1 4/1990
(Continued)

OTHER PUBLICATIONS

International Search Report and Written Opinion dated Dec. 18, 2020 pertaining to International application No. PCT/US2020/049910 filed Sep. 9, 2020, 15 pgs.
(Continued)

*Primary Examiner* — Crystal J. Lee
(74) *Attorney, Agent, or Firm* — Dinsmore & Shohl LLP

(57) ABSTRACT

Methods for producing proppants with a fluorinated polyurethane proppant coating are provided. The methods include coating the proppant particles with a strengthening agent, a strengthening agent, and a resin to produce proppants with fluorinated polyurethane proppant coating. Additionally, a proppant comprising a proppant particle and a fluorinated polyurethane proppant coating is provided. The fluorinated polyurethane proppant coating includes a strengthening agent, a strengthening agent, and a resin. The fluorinated polyurethane proppant coating coats the proppant particle. Additionally, a method for increasing a rate of hydrocarbon production from a subsurface formation through the use of the proppants is provided.

22 Claims, 1 Drawing Sheet

(51) Int. Cl.

| | | |
|---|---|---|
| *C08G 18/28* | (2006.01) | |
| *C08G 18/54* | (2006.01) | |
| *C08G 18/58* | (2006.01) | |
| *C08G 18/65* | (2006.01) | |
| *C08G 18/76* | (2006.01) | |
| *C09D 175/12* | (2006.01) | |
| *C09K 8/62* | (2006.01) | |
| *E21B 43/267* | (2006.01) | |

(56) References Cited

U.S. PATENT DOCUMENTS

| | | |
|---|---|---|
| 7,789,147 B2 | 9/2010 | Brannon et al. |
| 8,176,981 B2 | 5/2012 | Savu et al. |
| 8,236,737 B2 | 8/2012 | Fan et al. |
| 8,678,090 B2 | 3/2014 | Baran, Jr. et al. |
| 8,763,700 B2 | 7/2014 | McDaniel et al. |
| 8,993,489 B2 | 3/2015 | McDaniel et al. |
| 9,040,467 B2 | 5/2015 | McDaniel et al. |
| 9,290,690 B2 | 3/2016 | McDaniel et al. |
| 9,518,214 B2 | 12/2016 | McCrary et al. |
| 9,523,030 B2 | 12/2016 | Zhang |
| 9,562,187 B2 | 2/2017 | McCrary et al. |
| 9,562,188 B2 | 2/2017 | Monroe et al. |
| 9,624,421 B2 | 4/2017 | McDaniel et al. |
| 9,708,527 B2 | 7/2017 | Nguyen |
| 9,725,645 B2 | 8/2017 | Monastiriotis et al. |
| 9,896,620 B2 | 2/2018 | Zielinski et al. |
| 2007/0166475 A1 | 7/2007 | Fournier et al. |
| 2010/0018706 A1 | 1/2010 | Fan et al. |
| 2010/0276142 A1 | 11/2010 | Skildum et al. |
| 2012/0055668 A1* | 3/2012 | Wu ................. C09K 8/588 166/250.01 |
| 2013/0292118 A1 | 11/2013 | Nguyen |
| 2014/0060833 A1 | 3/2014 | Kuhlamann et al. |
| 2014/0162911 A1* | 6/2014 | Monastiriotis ......... C09K 8/805 507/221 |
| 2014/0345864 A1 | 11/2014 | Winter et al. |
| 2016/0194556 A1 | 7/2016 | McDaniel et al. |
| 2016/0376496 A1 | 12/2016 | Gershanovich et al. |

FOREIGN PATENT DOCUMENTS

| | | | |
|---|---|---|---|
| WO | 2010132362 A2 | 11/2010 | |
| WO | WO-2010132362 A2 * | 11/2010 | ............... C09K 8/80 |

OTHER PUBLICATIONS

Ian et al. "Synthesis and surface mobility of segmented polyurethanes with fluorinated side chains attached to hard blocks" Polymer 45 (2004) 1495-1502, 8 pgs.

* cited by examiner

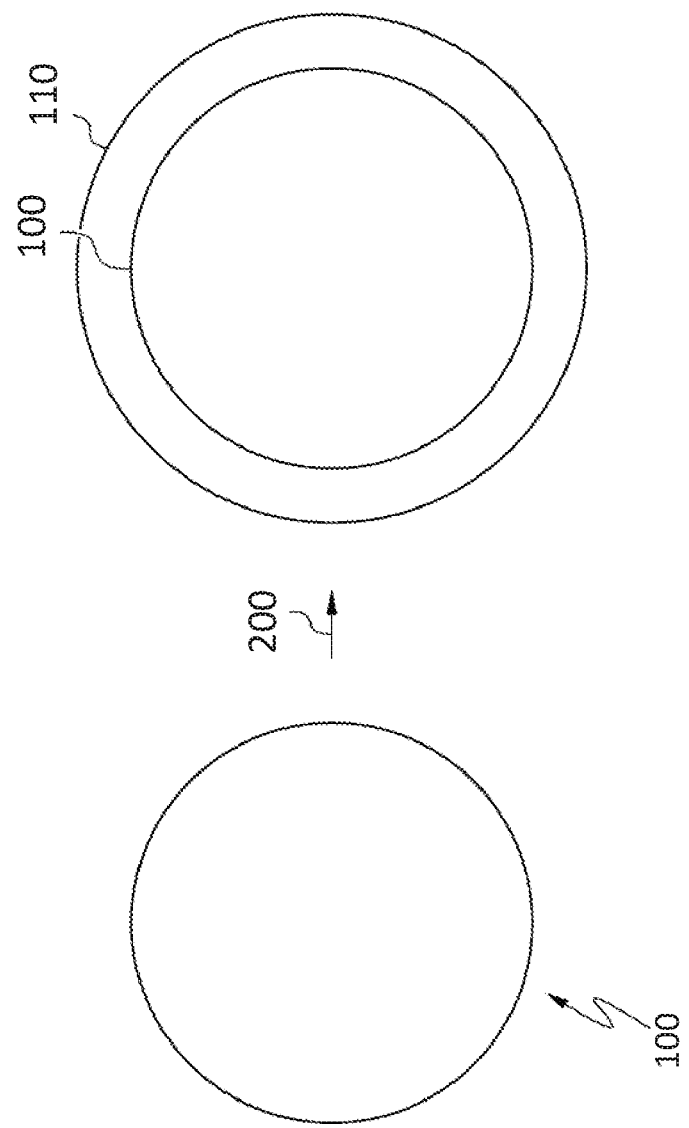

COATED PROPPANT AND METHODS OF MAKING AND USE THEREOF

TECHNICAL FIELD

Embodiments of the present disclosure generally relate to coated proppants and methods of making and use thereof.

BACKGROUND

Hydraulic fracturing is a stimulation treatment routinely performed on oil and gas wells. Hydraulic fracturing fluids are pumped into the subsurface formation to be treated, causing fractures to open in the subsurface formation. The wings of the fracture extend away from the wellbore in opposing directions according to the natural stresses within the formation. Proppant, such as grains of sand of a particular size, may be mixed with the treatment fluid to keep the fracture open when the treatment is complete.

SUMMARY

It is often desirable during and after fracturing a subsurface formation to hold the fractures open through the use of proppants for more effective oil and gas production than without. However, sand particles, which are used as a proppant, may not provide sufficient crush resistance for use in a given subsurface formation due to the polycrystalline nature of the grains. Conventional uncoated proppants break under downhole stress. Ceramic proppants break down in wet conditions, which cause them to lose their crush resistance. Temperatures downhole exacerbate this effect.

Proppant coatings are used to protect the proppant particle from degradation by the presence of aqueous fluids at downhole temperatures. The proppant coating increases the surface area of the particle; therefore, the crush stress is distributed over a larger area of the coated proppant particle. In turn, the distribution of force along a larger area should result in a decrease in the amount of crushed proppant particles, also known as 'the crush percentage.' The proppant coating also adheres to the proppant and prevents proppants that are crushed upon application of formation stress from releasing proppant fines. Proppant fines may migrate into the formation and restrict flow conductivity of the formation. However, typical polyurethane proppant coatings are prone to hydrolysis and accelerated degradation of the coating at temperatures greater than 250° F.

Accordingly, a need exists for a strong, chemically-resistant proppant coating that may be used at temperatures greater than 250° F. without hydrolysis or degradation of the coating. The use of fluorinated polyurethane proppant coating results in a hydrophobic proppant coating, leading to less hydrolysis and degradation at downhole temperatures. Adding strengthening agents to the coating further enhances the mechanical strength of the coating materials. This hydrophobic fluorinated polyurethane proppant coating provides resistance to the chemicals present in hydraulic fracturing fluid, leading to less degradation downhole.

According to the subject matter of the present disclosure, a coated proppant including a proppant particle and a fluorinated polyurethane proppant coating is disclosed. The fluorinated polyurethane proppant coating is a polymerized reaction product of at least one of diisocyanate and polyisocyanate and at least one of aliphatic or aromatic fluorinated alcohols and fluorinated polyols. The reaction may optionally contain aliphatic or aromatic alcohols and polyols to control the hydrophobicity and oleophobicity of the coating. The crosslinked fluorinated polyurethane proppant coating coats the proppant particle.

In accordance with another embodiment of the present disclosure, a method for producing coated proppants with a fluorinated polyurethane proppant coating is disclosed. The method includes forming the fluorinated polyurethane proppant coating by reacting at least one of diisocyanate and polyisocyanate, and at least one of aliphatic or aromatic fluorinated alcohols and fluorinated polyols. The reaction may optionally contain aliphatic or aromatic alcohols and polyols to control the hydrophobicity and oleophobicity of the coating. The method further includes coating proppant particles with the fluorinated polyurethane proppant coating to produce coated proppants with fluorinated polyurethane proppant coating.

BRIEF DESCRIPTION OF THE DRAWING

The following detailed description of specific embodiments of the present disclosure can be best understood when read in conjunction with the following drawing, where like structure is indicated with like reference numerals and in which:

FIG. 1 is a schematic view of a proppant particle and a coated proppant, according to one or more embodiments described in this disclosure.

DETAILED DESCRIPTION

As used throughout this disclosure, the term "condensate" refers to a liquid hydrocarbon phase that generally occurs in association with natural gas. Its presence as a liquid phase depends on temperature and pressure conditions in the reservoir allowing condensation of liquid from vapor. The production of condensate reservoirs can be complicated, because of the pressure sensitivity of some condensates. During production, there is a risk of the condensate changing from gas to liquid if the reservoir pressure decreases to less than the dew point during production. Hydrocarbon gas produced in association with condensate is called wet gas. The API gravity of condensate is typically from 50° to 120°.

As used throughout this disclosure, the term "condensate banking" refers to a relative permeability effect where condensate drops out of the vapor phase around the wellbore when the pressure decreases to less than the dew point in response to drawdown or depletion. Gas production rate may be hindered by the permeability reduction.

As used throughout this disclosure, the term "hierarchical roughness" refers to micro roughness covered with nano roughness. This differs from unitary roughness as the material is not solely micro roughness or nano roughness, but a combination of the two.

As used throughout this disclosure, the term "hydraulic fracturing" refers to a stimulation treatment routinely performed on hydrocarbon wells in reservoirs with a permeability of less than 10 milliDarcys. Hydraulic fracturing fluids are pumped into a subsurface formation, causing a fracture to form or open. The wings of the fracture extend away from the wellbore in opposing directions according to the natural stresses within the subsurface formation. Proppants are mixed with the treatment fluid to keep the fracture open when the treatment is complete. Hydraulic fracturing creates fluid communication with a subsurface formation and bypasses damage, such as condensate banking, that may exist in the near-wellbore area.

As used throughout this disclosure, the term "subsurface formation" refers to a body of rock that is sufficiently distinctive and continuous from the surrounding rock bodies that the body of rock can be mapped as a distinct entity. A subsurface formation is, therefore, sufficiently homogenous to form a single identifiable unit containing similar rheological properties throughout the subsurface formation, including, but not limited to, porosity and permeability. A subsurface formation is the fundamental unit of lithostratigraphy.

As used throughout this disclosure, the term "lithostatic pressure" refers to the pressure of the weight of overburden, or overlying rock, on a subsurface formation.

As used throughout this disclosure, the term "producing subsurface formation" refers to the subsurface formation from which hydrocarbons are produced.

As used throughout this disclosure, the term "proppants" refers to particles mixed with hydraulic fracturing fluid to hold fractures open after a hydraulic fracturing treatment. Proppant materials are carefully sorted for mesh size, roundness and sphericity to provide an efficient conduit for fluid production from the reservoir to the wellbore.

As used throughout this disclosure, the term "reservoir" refers to a subsurface formation having sufficient porosity and permeability to store and transmit fluids.

As used throughout this disclosure, the term "wings" refers to the two cracks formed by a fracture being 180° apart and typically similar in shape and size.

As used throughout this disclosure, the term "wellbore" refers to the drilled hole or borehole, including the openhole or uncased portion of the well. Borehole may refer to the inside diameter of the wellbore wall, the rock face that bounds the drilled hole.

To produce hydrocarbons from a hydrocarbon-containing reservoir, production wells are drilled to a depth that enables hydrocarbons to travel from the subsurface formation to the surface. However, when producing hydrocarbon gas, the wellbore and subsurface formation pressure decrease as the volume of hydrocarbon gas in the reservoir decreases. If pressure decreases to less than the dew point of the hydrocarbon gas, condensate may form and create a liquid blockage. This liquid blockage decreases the permeability between the wellbore and the subsurface formation thereby decreasing the rate of production of the hydrocarbon gas.

The present disclosure is directed to compositions and methods for producing proppants with a fluorinated polyurethane proppant coating, to hydraulic fracturing fluids including proppant, and to methods for increasing a rate of hydrocarbon production from a subsurface formation through the use of proppants with a fluorinated polyurethane proppant coating. The proppant comprises a proppant particle and a fluorinated polyurethane proppant coating. The fluorinated polyurethane proppant coating is a polymerized reaction product of at least one of diisocyanate and polyisocyanate and at least one of aliphatic or aromatic fluorinated alcohols and fluorinated polyols. The reaction may optionally contain aliphatic or aromatic alcohols and polyols to control the hydrophobicity and oleophobicity of the coating. The fluorinated polyurethane proppant coating coats the proppant particle. The fluorinated polyurethane proppant coating may be of uniform thickness or may comprise changes in thickness throughout, leading to hierarchical roughness in the fluorinated polyurethane proppant coating.

As previously disclosed, the strengthening agent enhances the mechanical strength of the fluorinated polyurethane proppant coating and provides resistance to chemicals used in hydraulic fracturing fluid. Among other benefits, fluorinated polyurethane proppant coating has hydrophobic or oleophobic characteristics, which reduces the interfacial tension and prevents condensate or water blockage in the wellbore, increasing gas relative permeability and thereby reducing condensate banking. Furthermore, hydrophobic characteristics mean that water will not wet the surface, which decreases the degradation of the proppants due to contact with water. These wettability characteristics enhance the load recovery of hydraulic fracturing fluid or water after fracturing operations as the hydrocarbons will experience less friction from contact with the proppant. This increases the rate of hydrocarbon production and the overall amount of hydrocarbon production.

FIG. 1 schematically portrays two states of a proppant particle 100. On the left, a proppant particle 100 is depicted in a first, uncoated state. Then, on the right, a coated proppant is depicted in which the proppant particle 100 is in a second, coated state. In the second state, the proppant particle 100 has undergone a coating step 200 to be coated with a fluorinated polyurethane proppant coating 110, forming a coated proppant.

The proppant particle may be chosen from any type of proppant suitable for use in hydraulic fracturing applications. As previously described, proppants are propping agent particles used in hydraulic fracturing fluids to maintain and hold open subsurface fractures during or following subsurface treatment. In some embodiments, the proppant particle may comprise particles of materials such as oxides, silicates, sand, ceramic, resin, epoxy, plastic, mineral, glass, or combinations thereof. For instance, the proppant particle may comprise graded sand, treated sand, ceramic, or plastic. The proppant particle may comprise particles of bauxite, sintered bauxite, $Ti^{4+}$/polymer composites, where the superscript "4+" stands for the oxidation state of titanium, titanium nitride (TiN), or titanium carbide. The proppant particle may comprise glass particles or glass beads. Embodiments of the present disclosure may utilize at least one proppant particle and in embodiments in which more than one proppant particle is used, the proppant particles may contain a mixture of two or more different materials.

The material of the proppant particle may be chosen based on the particular application and characteristics desired, such as the depth of the subsurface formation in which the proppant particles will be used, as proppant particles with greater mechanical strength are needed at greater lithostatic pressures. For instance, ceramic proppant materials exhibit greater strength, thermal resistance, and conductivity than sands. Additionally, ceramic proppant materials have more uniform size and shape than sands. Fully (pre-cured) or partially cured (curable) unfunctionalized organic resin-coated sand may be chosen in embodiments to provide sand particles of irregular size and shape with greater crush resistance strength and conductivity.

The proppant particle may include various sizes or shapes. In some embodiments, the one or more proppant particles may have sizes from 8 mesh to 140 mesh (diameters from 105 micrometers (μm) to 2380 μm). In some embodiments, the proppant particles may have sizes from 8 mesh to 16 mesh (diam. 2380 μm to 1180 μm), 16 mesh to 30 mesh (diam. 600 μm to 1190 μm), 20 mesh to 40 mesh (diam. 420 μm to 840 μm), 30 mesh to 50 mesh (diam. 300 μm to 595 μm), 40 mesh to 70 mesh (diam. 210 μm to 420 μm) or 70 mesh to 140 mesh (diam. 105 μm to 210 μm).

In some embodiments, the proppant particles may have a rough surface texture that may increase adhesion of the fluorinated polyurethane proppant coating to the proppant particle. The surfaces of the proppant particles may be roughened to increase the surface area of the proppant particle by any suitable physical or chemical method, including, for example, using an appropriate etchant. In some embodiments, the proppant particle may have a surface that provides a desired adhesion of the fluorinated polyurethane proppant coating to the proppant particle or may already be sufficiently rough without a need for chemical or physical roughening. Specifically, ball milling proppant particles may provide relatively rounder particles as well as particles with increased surface roughness.

The term "rough" refers to a surface having at least one deviation from the normalized plane of the surface, such as a depression or protrusion. The surface may be uneven and irregular and may have one or more imperfections, such as dimples, stipples, bumps, projections or combinations of these. The rough surface may have an arithmetic average roughness ($R_a$) of greater than or equal to 1 nanometer (nm) (1 nm=0.001 μm). $R_a$ is defined as the arithmetic average of the differences between the local surface heights and the average surface height and can be described by Equation 1, contemplating n measurements:

$$R_a = \frac{1}{n}\sum_{i=1}^{n}|y_i| \quad \text{EQUATION 1}$$

In Equation 1, each $y_i$ is the amount of deviation from the normalized plane of the surface (meaning the depth or height of a depression or protrusion, respectively) of the absolute value of the ith of n measurements. Thus, $R_a$ is the arithmetic average of the absolute values of n measurements of deviation y from the normalized plane of the surface. In some embodiments, the surface of the proppant particle may have an $R_a$ of greater than or equal to 2 nm (0.002 μm), or greater than or equal to 10 nm (0.01 μm), or greater than or equal to 50 nm (0.05 μm), or greater than or equal to 100 nm (0.1 μm), or greater than or equal to 1 μm.

As previously discussed in this disclosure, the fluorinated polyurethane proppant coating is a polymerized reaction product of at least one of diisocyanate and polyisocyanate and at least one of aliphatic or aromatic fluorinated alcohols and fluorinated polyols. The reaction may optionally contain aliphatic or aromatic alcohols and polyols to control the hydrophobicity and oleophobicity of the coating. Through this reaction, a fluoro group is polymerized into the cross-linked polyurethane polymer backbone of the fluorinated polyurethane proppant coating.

Isocyanates are organic compounds that contain an isocyanate group, which is a functional group with the formula R—N=C=O. A diisocyanate is an isocyanate with two isocyanate groups. The diisocyanate and polyisocyanate may be aliphatic or aromatic. Diisocyanates are manufactured for reactions with polyols or alcohols in the production of polyurethanes. The polyisocyanate and diisocyanate may include methylene diphenyl diisocyanate, toluene diisocyanate, hexamethylene diisocyanate, isophorone diisocyanate, methyl isocyanate, toluene-2,4-diisocyanate, 1,5 naphthalene diisocyanate, diphenylmethane-2,4-diisocyanate, diphenylmethane-2,2-diisocyanate, bis(isocyanatemethyl)cyclohexane, 1,3-bis(isocyanatemethyl)cyclohexane, 1,4-bis(isocyanatemethyl)cyclohexane, ethylene diisocyanate and 1,12-dodecane diisocyanate, or combinations thereof. The polyisocyanate may have a Mw of from 1,000 to 10,000, or of about 1,000 to 7,000. The polyisocyanate may have an NCO group content of about 3% to about 50%, or of about 13% to about 24%, and an average functionality of about 2 to about 3.

In some embodiments, the polyisocyanate may include polymethylene isocyanates, cycloaliphatic isocyanates, or aromatic polyisocyanates. Polymethylene isocyanates may include 1,4-tetramethylene diisocyanate, 1,5-pentamethylene diisocyanate, hexamethylene diisocyanates (HDIs or HMDIs), 1,6-HDI, 1,7-heptamethylene diisocyanate, 2,2,4- and 2,4,4-trimethylhexamethylene diisocyanate, 1,10-decamethylene diisocyanate and 2-methyl-1,5-pentamethylene diisocyanate. Additional suitable aliphatic polyisocyanates include 3-isocyanatomethyl-3,5,5-trimethylcyclohexl isocyanate, bis(4-isocyanatocyclohexyl)methane, 3,3,5-trimethyl-5-isocyanato-methyl-cyclohexyl isocyanate (also known as isophorone diisocyanate (IPDI)), 1,4-cyclohexane diisocyanate, m-tetramethylxylene diisocyanate, 4,4'-dicyclohexlmethane diisocyanate, and hydrogenated materials such as cyclohexylene diisocyanate and 4,4'-methylenedicyclohexyl diisocyanate (Hl2MDI).

The cycloaliphatic isocyanates may include cyclohexane-1,4-diisocyanate, cyclobutane-1,3-diisocyanate, cyclohexane-1,3-diisocyanate, 1-isocyanato-2-isocyanatomethyl cyclopentane, 1-isocyanato-3,3,5-trimethyl-5-isocyanatomethyl cyclohexane, 2,4'-dicyclohexylmethane diisocyanate, and 4,4'-dicyclohexylmethane diisocyanate.

The diisocyanates may include phenylene diisocyanate, toluene diisocyanate (TDI), xylene diisocyanate, 1,5-naphthalene diisocyanate, chlorophenylene 2,4-diisocyanate, bitoluene diisocyanate, dianisidine diisocyanate, tolidine diisocyanate, alkylated benzene diisocyanates, methylene-interrupted aromatic diisocyanates, 3,3'-dimethoxy-4,4'-bisphenylenediisocyanate, 3,3'-diphenyl-4,4'-biphenylenediisocyanate, 4,4'-biphenylene diisocyanate, 4-chloro-1,3-phenylene diisocyanate, 3,3'-dichloro-4,4'-biphenylene diisocyanate, and 1,5-naphthalene diisocyanate, toluol-2,4-diisocyanate; toluol-2,6-diisocyanate; 1,5-naphthalindiisocyanate; cumol-2,4-diisocyanate; 4-methoxy-1,3-phenyldiisocyanate; 4-chloro-1,3-phenyldiisocyanate; diphenylmethane-4,4-diisocyanate; diphenylmethane-2,4-diisocyanate; diphenylmethane-2,2-diisocyanate, 4-bromo-1,3-phenyldiisocyanate: 4-ethoxy-1,3-phenyl-diisocyanate; 2,4'-diisocyanate diphenylether, 5,6-dimethyl-1,3-phenyldiisocyanate; 2,4-dimethyl-1,3-phenyldiisocyanate; 4,4-diisocyanato-diphenylether, 4,6-dimethyl-1,3-phenyldiisocyanate; 9,10-anthracenediisocyanate; 1,4-tetramethylenediisocyanate; 1,6-hexamethylene diisocyanate; 1,10-decamethylene-diisocyanate, 1,3-cyclohexylene diisocyanate; 4,4'-methylene-bis-(cyclohexylisocyanate); Xylol diisocyanate; 1-isocyanato-3-methyl-isocyanate-3,5,5-trimethylcyclohexane (isophorone diisocyanate): 1-3-bis(isocyanato-1-methylethyl)benzol (m-TMXDI): 1,4-bis(isocyanato-1-methylethyl)benzol (p-TMXDI); oligomers or polymers of the previously mentioned isocyanate compounds; or mixtures of two or more of the previously mentioned isocyanate compounds or oligomers or polymers thereof.

Not intending to be limited by theory, an isocyanate forms a urethane linkage upon treatment with an alcohol, with the reaction: ROH+R'NCO→ROC(O)N(H)R' (where R and R' are alkyl or aryl groups). Furthermore, if a diisocyanate is treated with a compound containing two or more hydroxyl groups, such as a diol or a polyol, polymer chains, or polyurethanes, are formed.

The fluorinated alcohols and fluorinated polyols may have two or more hydroxyl moieties with fluorine atoms attached to one or more carbon atoms. The degree of fluorination may vary, as both partially fluorinated and perfluorinated aliphatic hydroxyfunctional compounds can be used. The fluorinated hydroxyl-functional compounds may be either straight chain or branched chain. The fluorinated alcohols may be aliphatic or aromatic. The aliphatic fluorinated alcohols may comprise at least one of fluoroalkane alcohols, fluoroether alcohols, and fluoro sulfonamide alcohols. The aliphatic fluorinated alcohols may comprise fluoro sulfonamide alcohol.

The fluoroalkane alcohols may comprise at least one of Zonyl® BA and Zonyl® BAL, produced by Sigma-Adrich. The fluoroalkane alcohol may comprise at least one of 2-(perfluoroalkyl)ethanol and may have a molecular weight of 443 grams per mole (g/mol). The fluoroalkane alcohol may have the formula $F(CF_2)_nCH_2CH_2OH$, where n is 5, 6, 7, 8, 9, or 10. The fluoroalkane alcohol may have a molecular weight of from 100 to 1,500 g/mol, from 100 to 1,000 g/mol, from 100 to 700 g/mol, from 100 to 600 g/mol, from 100 to 550 g/mol, from 100 to 500 g/mol, from 300 to 700 g/mol, from 300 to 600 g/mol, from 300 to 550 g/mol, from 300 to 500 g/mol, from 400 to 700 g/mol, from 400 to 600 g/mol, from 400 to 550 g/mol, from 400 to 500 g/mol, from 400 to 450 g/mol, from 450 to 700 g/mol, from 450 to 600 g/mol, from 450 to 550 g/mol, from 450 to 500 g/mol, from 475 to 700 g/mol, from 475 to 600 g/mol, from 475 to 550 g/mol, from 475 to 525 g/mol, from 475 to 500 g/mol, from 500 to 700 g/mol, from 500 to 600 g/mol, from 500 to 550 g/mol, or from 500 to 525 g/mol. The fluoroalkane alcohol may be soluble in acetone, methyl ethyl ketone (butanone), and isobutyl alcohol. The fluoroalkane alcohol may have a viscosity of from 1 to 25 centiPoise (cP), from 1 to 20 cP, from 1 to 15 cP, from 1 to 10 cP, from 1 to 5 cP, from 5 to 25 cP, from 5 to 20 cP, from 5 to 15 cP, from 5 to 10 cP, from 10 to 25 cP, from 10 to 20 cP, from 10 to 15 cP, or from 15 to 25 cP at 30° C. The fluoroalkane alcohol may have a boiling point of from 145 to 245° C., and may comprise fluorine in an amount of from 40 to 90 weight percent (wt. %), from 40 to 80 wt. %, from 40 to 75 wt. %, from 40 to 70 wt. %, from 40 to 65 wt. %, from 40 to 60 wt. %, from 40 to 50 wt. %, from 50 to 90 wt. %, from 50 to 80 wt. %, from 50 to 75 wt. %, from 50 to 70 wt. %, from 50 to 65 wt. %, from 50 to 60 wt. %, from 60 to 90 wt. %, from 60 to 80 wt. %, from 60 to 75 wt. %, from 60 to 70 wt. %, from 60 to 65 wt. %, from 65 to 90 wt. %, from 65 to 80 wt. %, from 65 to 75 wt. %, from 65 to 70 wt. %, from 70 to 90 wt. %, from 70 to 80 wt. %, from 70 to 75 wt. %, from 75 to 90 wt. %, from 75 to 80 wt. %, or of 70 wt. % as calculated by a weight of the fluoroalkane alcohol. The fluoroalkane alcohol may have a density of from 0.5 to 3 grams per milliLiter (g/mL), from 0.5 to 2 g/mL, from 0.5 to 1.5 g/mL, from 0.5 to 1 g/mL, 1 to 3 g/mL, from 1 to 2 g/mL, from 1 to 1.5 g/mL, from 1.5 to 3 g/mL, from 1.5 to 2 g/mL, from 2 to 3 g/mL, or of 1.7 g/mL.

The fluorosulfonamide alcohol may comprise Fluorad™ FC-10, produced by 3M™. The fluorosulfonamide alcohol may comprise the molecular formula $C_{12}$—$H_{10}$—$F_{17}$—N—$O_3$—S, and a molecular weight of from 100 to 1,500 g/mol, from 100 to 1,000 g/mol, from 100 to 700 g/mol, from 100 to 600 g/mol, from 100 to 550 g/mol, from 100 to 500 g/mol, from 300 to 700 g/mol, from 300 to 600 g/mol, from 300 to 550 g/mol, from 300 to 500 g/mol, from 400 to 700 g/mol, from 400 to 600 g/mol, from 400 to 550 g/mol, from 400 to 500 g/mol, from 450 to 700 g/mol, from 450 to 600 g/mol, from 450 to 550 g/mol, from 450 to 500 g/mol, from 475 to 700 g/mol, from 475 to 600 g/mol, from 475 to 550 g/mol, from 475 to 525 g/mol, from 475 to 500 g/mol, from 500 to 700 g/mol, from 500 to 600 g/mol, from 500 to 550 g/mol, or from 500 to 525 g/mol. The fluorosulfonamide alcohol may comprise a molecular weight of 571.247 g/mol.

The fluorinated polyols may comprise at least one of polyester polyols, polyether polyols, novolac polyols, resole polyols, and polyamide polyols. The fluorinated polyols may be aliphatic or aromatic. Specifically, the fluorinated polyols may include 1,2-propanediol-3-(N-ethyl perfluorooctanesulfonamide); 1,5-hexanediol-6-(N-ethyl perfluorooctanesulfonamide); 1,2-propanediol-3-(N-propyl perfluoroethane sulfonamide); 1,2-propanediol-2-(N-ethyl perfluorododecanesulfonamide); 1,5-hexanediol-6-(N-ethyl perfluorobutylcyclohexanesulfonamide); 1,2,3-butanetriol-4-(N-ethyl perfluorooctanesulfonamide), or combinations thereof. In some embodiments, the fluorinated polyol may comprise Fluorobase® Z-1030, produced by Ausimont.

The aliphatic fluorinated alcohols and the fluorinated polyols may have a molecular weight of from 100 to 30,000 g/mol, from 100 to 20,000 g/mol, from 100 to 10,000 g/mol, from 100 to 5,000 g/mol, from 100 to 2,000 g/mol, from 100 to 1,000 g/mol, from 100 to 500 g/mol, from 100 to 200 g/mol, from 200 to 30,000 g/mol, from 200 to 20,000 g/mol, from 200 to 10,000 g/mol, from 200 to 5,000 g/mol, from 200 to 2,000 g/mol, from 200 to 1,000 g/mol, from 200 to 500 g/mol, from 500 to 30,000 g/mol, from 500 to 20,000 g/mol, from 500 to 10,000 g/mol, from 500 to 5,000 g/mol, from 500 to 2,000 g/mol, from 500 to 1,000 g/mol, from 1,000 to 30,000 g/mol, from 1,000 to 20,000 g/mol, from 1,000 to 10,000 g/mol, from 1,000 to 5,000 g/mol, from 1,000 to 2,000 g/mol, from 2,000 to 30,000 g/mol, from 2,000 to 20,000 g/mol, from 2,000 to 10,000 g/mol, from 2,000 to 5,000 g/mol, from 5,000 to 30,000 g/mol, from 5,000 to 20,000 g/mol, from 5,000 to 10,000 g/mol, from 10,000 to 30,000 g/mol, from 10,000 to 20,000 g/mol, or from 20,000 to 30,000 g/mol.

The fluorinated polyurethane proppant coating has a surface energy of less than 50 milliJoules per square meter ($mJ/m^2$), less than 40 $mJ/m^2$, less than 38 $mJ/m^2$, less than 37 $mJ/m^2$, less than 36 $mJ/m^2$, less than 35 $mJ/m^2$, less than 33 $mJ/m^2$, less than 31 $mJ/m^2$, less than 30 $mJ/m^2$, less than 29 $mJ/m^2$, less than 25 $mJ/m^2$, less than 20 $mJ/m^2$, less than 18 $mJ/m^2$, less than 15 $mJ/m^2$, less than 10 $mJ/m^2$, or less than 5 $mJ/m^2$.

The fluorinated polyurethane proppant coating has glass transition temperature of from 80° F. to 250° F., from 80° F. to 200° F., from 80° F. to 175° F., from 80° F. to 150° F., from 80° F. to 125° F., from 80° F. to 100° F., from 100° F. to 250° F., from 100° F. to 200° F., from 100° F. to 175° F., from 100° F. to 150° F., from 100° F. to 125° F., from 125° F. to 250° F., from 125° F. to 200° F., from 125° F. to 175° F., from 125° F. to 150° F., from 150° F. to 250° F., from 150° F. to 200° F., from 150° F. to 175° F., from 175° F. to 250° F., from 175° F. to 200° F., from 200° F. to 250° F., or of 150° F. The glass transition temperature of a material characterizes the range of temperatures over which amorphous materials transition from a hard and relatively brittle "glassy" state into a viscous or rubbery state. This is a gradual and reversible transition. The use of aromatic polyols, diisocynates and polyisocynates may result in an increased glass transition temperature as compared to the glass transition temperature resulting from the use of aliphatic polyols, diisocyanates, and polyisocyanates.

The coated proppants may comprise from 0.5 to 20 wt. %, from 0.5 to 15 wt. %, from 0.5 to 10 wt. %, from 0.5 to 8 wt. %, from 0.5 to 6 wt. %, from 0.5 to 5 wt. %, from 0.5 to 4.5 wt. %, from 0.5 to 2 wt. %, from 0.5 to 1 wt. %, 1 to 20 wt. %, from 1 to 15 wt. %, from 1 to 10 wt. %, from 1 to 8 wt. %, from 1 to 6 wt. %, from 1 to 5 wt. %, from 1 to 4.5 wt. %, from 1 to 2 wt. %, 2 to 20 wt. %, from 2 to 15 wt. %, from 2 to 10 wt. %, from 2 to 8 wt. %, from 2 to 6 wt. %, from 2 to 5 wt. %, from 2 to 4.5 wt. %, 1 to 2 wt. %, 4.5 to 20 wt. %, from 4.5 to 15 wt. %, from 4.5 to 10 wt. %, from 4.5 to 8 wt. %, from 4.5 to 6 wt. %, from 4.5 to 5 wt. %, 5 to 20 wt. %, from 5 to 15 wt. %, from 5 to 10 wt. %, from 5 to 8 wt. %, from 5 to 6 wt. %, 8 to 20 wt. %, from 8 to 15 wt. %, from 8 to 10 wt. %, from 10 to 15 wt. %, from 10 to 20 wt. %, or from 15 to 20 wt. % fluorinated polyurethane proppant coating as calculated by a weight of the proppant particles.

The fluorinated polyurethane proppant coating may further comprise resin. Resin is a solid or viscous substance of plant or synthetic origin that is typically convertible into polymers, and may be a mixture of organic compounds such as terpenes, an organic compound produced by plants. The viscosity of resin may be greater than 20 centiPoise (cP), measured at a temperature of 120° C. In one embodiment, the resin may have no additional additives. The resin may comprise at least one of phenol, furan, epoxy, urethane, phenol-formaldehyde, polyester, vinyl ester, and urea aldehyde. The resin may comprise phenol-formaldehyde. The phenol-formaldehyde resin may comprise novolac or resole. Novolacs are phenol-formaldehyde resins with a formaldehyde to phenol molar ratio of less than 1, where the phenol units are mainly linked by methylene or ether groups, or both. The novolac polymer may have a molecular weight of from 1,000 to 100,000 grams per mole (g/mol), from 1,000 to 50,000 g/mol, from 1,000 to 25,000 g/mol, from 1,000 to 10,000 g/mol, from 1,000 to 5,000 g/mol, 5,000 to 100,000 g/mol, from 5,000 to 50,000 g/mol, from 5,000 to 25,000 g/mol, from 5,000 to 10,000 g/mol, 10,000 to 100,000 g/mol, from 10,000 to 50,000 g/mol, from 10,000 to 25,000 g/mol, from 25,000 to 50,000 g/mol, from 25,000 to 100,000 g/mol, or from 50,000 to 100,000 g/mol. The novolac polymer comprises a glass transition temperature greater than 250° F., 300° F., 350° F., 390° F., 400° F., 450° F., or 500° F. Novolacs are stable, meaning that novolacs do not react and do retain their polymer properties at temperatures of up to 300° F., 400° F., 425° F., 450° F., 475° F., 500° F., 550° F., or 600° F. Resoles are phenol-formaldehyde resins with a formaldehyde to phenol molar ratio of more than 1, where the phenol units are mainly linked by methylene or ether groups, or both. This can harden without the addition of a crosslinking agent due to abundance of methylene to bridge the phenol groups. The resole may have a molecular weight of from 1,000 to 100,000 g/mol, from 1,000 to 50,000 g/mol, from 1,000 to 25,000 g/mol, from 1,000 to 10,000 g/mol, from 1,000 to 5,000 g/mol, 5,000 to 100,000 g/mol, from 5,000 to 50,000 g/mol, from 5,000 to 25,000 g/mol, from 5,000 to 10,000 g/mol, 10,000 to 100,000 g/mol, from 10,000 to 50,000 g/mol, from 10,000 to 25,000 g/mol, from 25,000 to 50,000 g/mol, from 25,000 to 100,000 g/mol, or from 50,000 to 100,000 g/mol.

The coated proppants may comprise from 0.5 to 20 wt. %, from 0.5 to 15 wt. %, from 0.5 to 10 wt. %, from 0.5 to 8 wt. %, from 0.5 to 6 wt. %, from 0.5 to 5 wt. %, from 0.5 to 4.5 wt. %, from 0.5 to 2 wt. %, from 0.5 to 1 wt. %, 1 to 20 wt. %, from 1 to 15 wt. %, from 1 to 10 wt. %, from 1 to 8 wt. %, from 1 to 6 wt. %, from 1 to 5 wt. %, from 1 to 4.5 wt. %, from 1 to 2 wt. %, 2 to 20 wt. %, from 2 to 15 wt. %, from 2 to 10 wt. %, from 2 to 8 wt. %, from 2 to 6 wt. %, from 2 to 5 wt. %, from 2 to 4.5 wt. %, 1 to 2 wt. %, 4.5 to 20 wt. %, from 4.5 to 15 wt. %, from 4.5 to 10 wt. %, from 4.5 to 8 wt. %, from 4.5 to 6 wt. %, from 4.5 to 5 wt. %, 5 to 20 wt. %, from 5 to 15 wt. %, from 5 to 10 wt. %, from 5 to 8 wt. %, from 5 to 6 wt. %, 8 to 20 wt. %, from 8 to 15 wt. %, from 8 to 10 wt. %, from 10 to 15 wt. %, from 10 to 20 wt. %, or from 15 to 20 wt. % resin as calculated by a weight of the proppant particles.

The fluorinated polyurethane proppant coating may further comprise a strengthening agent. The strengthening agent may comprise at least one of glass fibers, carbon fibers, Kevlar fibers, carbon nanotubes, silica, alumina, mica, nanoclay, graphene, boron nitride nanotubes, vanadium pentoxide, zinc oxide, calcium carbonate, zirconium oxide, nanosilica, nanoalumina, nanozinc oxide, nanotubes, nanocalcium carbonate, and nanozirconium oxide. The strengthening agent may comprise carbon nanotubes. Carbon nanotubes comprise at least one of single-walled nanotubes, double-walled nanotubes, multi-walled carbon nanotubes, or narrow-walled nanotubes. The carbon nanotubes have a diameter of from 1 to 200 nm, from 20 to 100 nm, from 10 to 80 nm, from 4 to 20 nm, from 2 to 12 nm, from 2 to 10 nm, from 2 to 9 nm, from 2 to 8 nm, from 2 to 7 nm, from 2 to 6 nm, from 2 to 5 nm, from 2 to 4 nm, from 2 to 3 nm, 3 to 12 nm, from 3 to 10 nm, from 3 to 9 nm, from 3 to 8 nm, from 3 to 7 nm, from 3 to 6 nm, from 3 to 5 nm, from 3 to 4 nm, 4 to 12 nm, from 4 to 10 nm, from 4 to 9 nm, from 4 to 8 nm, from 4 to 7 nm, from 4 to 6 nm, from 4 to 5 nm, 5 to 12 nm, from 5 to 10 nm, from 5 to 9 nm, from 5 to 8 nm, from 5 to 7 nm, from 5 to 6 nm, 6 to 12 nm, from 6 to 10 nm, from 6 to 9 nm, from 6 to 8 nm, from 6 to 7 nm, 7 to 12 nm, from 7 to 10 nm, from 7 to 9 nm, from 7 to 8 nm, 8 to 12 nm, from 8 to 10 nm, from 8 to 9 nm, 9 to 12 nm, from 9 to 10 nm, from 10 to 12 nm, or of 8 nm; a length of from 20 to 500 µm, 20 to 200 µm, 20 to 150 µm, 20 to 100 µm, 50 to 500 µm, from 50 to 200 µm, from 50 to 150 µm, from 50 to 100 µm, from 100 to 500 µm, from 100 to 200 µm, from 100 to 150 µm, from 150 to 500 µm, from 150 to 200 µm, or from 200 to 500 µm; an aspect ratio of from 100 to 50,000, from 500 to 30,000, from 1,000 to 20,000, from 1,000 to 100,000, from 1,000 to 50,000, from 1,000 to 40,000, from 1,000 to 30,000, from 1,000 to 25,000, from 1,000 to 20,000, from 1,000 to 15,000, from 1,000 to 12,000, from 1,000 to 10,000, from 1,000 to 8,000, from 8,000 to 100,000, from 8,000 to 50,000, from 8,000 to 40,000, from 8,000 to 30,000, from 8,000 to 25,000, from 8,000 to 20,000, from 8,000 to 15,000, from 8,000 to 12,000, from 8,000 to 10,000, from 10,000 to 100,000, from 10,000 to 50,000, from 10,000 to 40,000, from 10,000 to 30,000, from 10,000 to 25,000, from 10,000 to 20,000, from 10,000 to 15,000, from 10,000 to 12,000, from 12,000 to 100,000, from 12,000 to 50,000, from 12,000 to 40,000, from 12,000 to 30,000, from 12,000 to 25,000, from 12,000 to 20,000, from 12,000 to 15,000, from 15,000 to 100,000, from 15,000 to 50,000, from 15,000 to 40,000, from 15,000 to 30,000, from 15,000 to 25,000, from 15,000 to 20,000, from 20,000 to 100,000, from 20,000 to 50,000, from 20,000 to 40,000, from 20,000 to 30,000, from 20,000 to 25,000, from 25,000 to 100,000, from 25,000 to 50,000, from 25,000 to 40,000, from 25,000 to 30,000, from 30,000 to 100,000, from 30,000 to 50,000, from 30,000 to 40,000, from 40,000 to 50,000, from 40,000 to 100,000, or from 50,000 to 100,000; and a specific surface area of from 100 to 12,000 square meter per gram ($m^2/g$), from 100 to 10,000 $m^2/g$, from 100 to 800 $m^2/g$, from 100 to 700 $m^2/g$, from 400 to 12,000 $m^2/g$, from 400 to 10,000 $m^2/g$, from 400 to 800 $m^2/g$, from 100 to 1,500 $m^2/g$, from 120 to 1,000 $m^2/g$, from 150 to 850 $m^2/g$, or from 400 to 700 $m^2/g$, where the specific surface area is calculated through the Brunauer-Emmett-Teller (BET) theory. The multi-walled carbon nanotubes comprise a metal oxide percentage of 10 wt. % or less, 5 wt. % or less, 3 wt. % or less, 2 wt. % or less, 1.5 wt. % or less, 1 wt. % or less, or 0.5 wt. % or less; and a bulk density of from 0.001 to 0.12 grams per cubic centimeter (g/cm$^3$), from 0.01 to 0.08 g/cm$^3$, from 0.02 to 0.06 g/cm$^3$, from 0.01 to 1 g/cm$^3$, from 0.01 to 0.5 g/cm$^3$, from 0.01 to 0.2 g/cm$^3$, from 0.01 to 0.1 g/cm$^3$, from 0.01 to 0.05 g/cm$^3$, from 0.01 to 0.02 g/cm$^3$, from 0.02 to 1 g/cm$^3$, from 0.02 to 0.5 g/cm$^3$, from 0.02 to 0.2 g/cm$^3$, from 0.02 to 0.1 g/cm$^3$, from 0.02 to 0.05 g/cm$^3$, from 0.05 to 1 g/cm$^3$, from 0.05 to 0.5 g/cm$^3$, from 0.05 to 0.2 g/cm$^3$, from 0.05 to 0.1 g/cm$^3$, from 0.06 to 0.08 g/cm$^3$, from 0.1 to 1 g/cm$^3$, 0.1 to 0.5 g/cm$^3$, from 0.1 to 0.2 g/cm$^3$, from 0.2 to 1 g/cm$^3$, from 0.2 to 0.5 g/cm$^3$, or from 0.5 to 1 g/cm$^3$. The fluorinated polyurethane proppant coating may comprise from 1 to 15 wt. %, from 1 to 12 wt. %, from 1 to 10 wt. %, from 1 to 8 wt. %, from 1 to 5 wt. %, from 5 to 15 wt. %, from 5 to 12 wt. %, from 5 to 10 wt. %, from 5 to 8 wt. %, from 8 to 15 wt. %, from 8 to 12 wt. %, from 8 to 10 wt. %, from 10 to 15 wt. %, from 10 to 12 wt. %, or from 12 to 15 wt. % of the strengthening agent. The fluorinated polyurethane proppant coating may comprise less than or equal to 20 wt. %, 15 wt. %, 10 wt. %, 5 wt. %, 2 wt. %, 1.5 wt. %, 1 wt. %, 0.75 wt. %, 0.5 wt. %, 0.2 wt. %, or 0.1 wt. % of the strengthening agent. The coated proppants may comprise from 0.1 to 10 wt. %, from 0.1 to 5 wt. %, from 0.1 to 3 wt. %, from 0.1 to 2 wt. %, from 0.1 to 1.5 wt. %, from 0.1 to 1 wt. %, from 0.1 to 0.5 wt. %, from 0.1 to 0.2 wt. %, 0.2 to 10 wt. %, from 0.2 to 5 wt. %, from 0.2 to 3 wt. %, from 0.2 to 2 wt. %, from 0.2 to 1.5 wt. %, from 0.2 to 1 wt. %, from 0.2 to 0.5 wt. %, from 0.5 to 10 wt. %, from 0.5 to 5 wt. %, from 0.5 to 3 wt. %, from 0.5 to 2 wt. %, from 0.5 to 1.5 wt. %, from 0.5 to 1 wt. %, from 1 to 10 wt. %, from 1 to 5 wt. %, from 1 to 5 wt. %, from 1 to 3 wt. %, from 1 to 2 wt. %, from 1 to 1.5 wt. %, from 1.5 to 10 wt. %, from 1.5 to 5 wt. %, from 1.5 to 3 wt. %, from 1.5 to 2 wt. %, from 2 to 10 wt. %, from 2 to 5 wt. %, from 2 to 3 wt. %, from 3 to 10 wt. %, from 3 to 5 wt. %, or from 5 to 10 wt. % strengthening agent as calculated by a weight of the fluorinated polyurethane proppant coating.

The fluorinated polyurethane proppant coating may further comprise a tracer material. The suitable tracer material may include, but are not limited to, ionic contrast agents such as thorium dioxide (ThO$_2$), barium sulfate (BaSO$_4$), diatrizoate, metrizoate, iothalamate, and ioxaglate; and non-ionic contrast agents such as iopamidol, iohexol, ioxilan, iopromide, iodixanol, and ioversol. Furthermore, the tracer material may be present in a range of from 0.001 to 5.0 wt. %, from 0.001 to 3 wt. %, from 0.001 to 1 wt. %, from 0.001 to 0.5 wt. %, from 0.001 to 0.1 wt. %, from 0.005 wt. %, from 0.005 to 5.0 wt. %, from 0.005 to 3 wt. %, from 0.005 to 1 wt. %, from 0.005 to 0.5 wt. %, from 0.005 to 0.1 wt. %, from 0.01 to 5.0 wt. %, from 0.01 to 3 wt. %, from 0.01 to 1 wt. %, from 0.01 to 0.5 wt. %, from 0.5 to 5.0 wt. %, from 0.5 to 3 wt. %, from 0.5 to 1 wt. %, from 1 to 5.0 wt. %, from 1 to 3 wt. %, or from 3 to 5 wt. % as calculated by a weight of the fluorinated polyurethane proppant coating.

The fluorinated polyurethane proppant coating may further comprise a coupling agent. A coupling agent is a compound that provides a chemical bond between two dissimilar materials, such as an inorganic material and an organic material. The coupling agent may form a bond between the proppant particle and the resin. The coupling agent may comprise at least one of epoxy, amino, aryl, and vinyl groups. In some embodiments, the coupling agent may comprise at least one of 3-glycidoxypropyltrimethoxysilane, 3-aminopropyltriethoxysilane, 3-aminopropyltrimethoxysilane, and 3-chloropropyltrimethoxysilane. The coupling agent may comprise from 0.1 to 20 volume percent (vol. %), from 0.1 to 15 vol. %, from 0.1 to 10 vol. %, from 0.1 to 5 vol. %, from 0.1 to 3 vol. %, from 0.1 to 1 vol. %, from 0.1 to 0.5 vol %, 0.1 to 20 vol. %, from 0.5 to 20 vol. %, from 0.5 to 15 vol. %, from 0.5 to 10 vol. %, from 0.5 to 5 vol. %, from 0.5 to 3 vol. %, from 0.5 to 1 vol. %, from 1 to 20 vol. %, from 1 to 15 vol. %, from 1 to 10 vol. %, from 1 to 5 vol. %, from 1 to 3 vol. %, from 3 to 20 vol. %, from 3 to 15 vol. %, from 3 to 10 vol. %, from 3 to 5 vol. %, from 5 to 20 vol. %, from 5 to 15 vol. %, from 5 to 10 vol. %, from 10 to 20 vol. %, from 10 to 15 vol. %, or from 15 to 20 vol. % 3-glycidoxypropyltrimethoxysilane and from 80 to 99.9 vol. %, from 80 to 99.5 vol. %, from 80 to 99 vol. %, from 80 to 95 vol. %, from 80 to 90 vol. %, from 80 to 85 vol. %, from 85 to 99.9 vol. %, from 85 to 99.5 vol. %, from 85 to 99 vol. %, from 85 to 95 vol. %, from 85 to 90 vol. %, from 90 to 99.9 vol. %, from 90 to 99.5 vol. %, from 90 to 99 vol. %, from 90 to 95 vol. %, 95 to 99.9 vol. %, from 95 to 99.5 vol. %, from 95 to 99 vol. %, from 99 to 99.9 vol. %, from 99 to 99.5 vol. %, from 99 to 99.9 vol. %, or from 99.5 to 99.9 vol. % deionized water. The fluorinated polyurethane proppant coating may comprise from 0.001 to 20 wt. %, from 0.001 to 15 wt. %, from 0.001 to 10 wt. %, from 0.001 to 5 wt. %, from 0.001 to 2 wt. %, from 0.001 to 1 wt. %, from 0.001 to 0.2 wt. %, from 0.001 to 0.05 wt. %, from 0.05 to 20 wt. %, from 0.05 to 15 wt. %, from 0.05 to 10 wt. %, from 0.05 to 5 wt. %, from 0.05 to 2 wt. %, from 0.05 to 1 wt. %, from 0.05 to 0.2 wt. %, from 0.2 to 20 wt. %, from 0.2 to 15 wt. %, from 0.2 to 10 wt. %, from 0.2 to 5 wt. %, from 0.2 to 2 wt. %, from 0.2 to 1 wt. %, from 1 to 20 wt. %, from 1 to 15 wt. %, from 1 to 10 wt. %, from 1 to 5 wt. %, from 1 to 2 wt. %, from 2 to 20 wt. %, from 2 to 15 wt. %, from 2 to 10 wt. %, from 2 to 5 wt. %, from 5 to 20 wt. %, from 5 to 15 wt. %, from 5 to 10 wt. %, from 10 to 20 wt. %, from 10 to 15 wt. %, or from 15 to 20 wt. % coupling agent as calculated by a weight of the fluorinated polyurethane proppant coating.

The fluorinated polyurethane proppant coating may further comprise a crosslinker. A crosslinker is a substance or agent that induces the subsurface formation of crosslinks. Mixing an unpolymerized or partially polymerized resin with a crosslinker results in a chemical reaction that crosslinks the resin. In some embodiments, the fluorinated polyols may function as a crosslinker. A crosslinked fluorinated polyurethane proppant coating may retain its shape without dissolving in the hydraulic fracturing fluid, while maintaining a sufficient attraction or bond to the proppant particle. The degree of crosslinking may be controlled by the molar or weight ratio of crosslinker to monomer. In some embodiments, the crosslinker may comprise at least one of hexamethylenetetramine, paraformaldehyde, oxazolidines, melamine resins, aldehyde donors, or resole polymers. The coated proppants may comprise from 8 to 20 wt. %, from 8 to 18 wt. %, from 8 to 15 wt. %, from 10 to 20 wt. %, from 10 to 18 wt. %, from 10 to 16 wt. %, from 10 to 15 wt. %, from 13 to 20 wt. %, from 13 to 18 wt. %, or from 13 to 15 wt. % crosslinker as calculated by a weight of the fluorinated polyurethane proppant coating.

In some embodiments, the fluorinated polyurethane proppant coating further includes a lubricating agent to reduce friction on the fluorinated polyurethane proppant coating. The lubricating agent may include at least one of calcium stearate or silicone oil. The fluorinated polyurethane proppant coating may comprise from 0.01 to 8 wt. %, from 0.01 to 3.75 wt. %, from 0.01 to 1.75 wt. %, from 0.25 to 8 wt. %, from 0.25 to 3.75 wt. %, from 0.25 to 1.75 wt. %, from 0.75 to 8 wt. %, from 0.75 to 3.75 wt. %, or from 0.75 to 1.75 wt. % lubricating agent as calculated by a weight of the fluorinated polyurethane proppant coating.

The fluorinated polyurethane proppant coating may further include an accelerating agent. The accelerating agent may include at least one of hydrochloric acid, Lewis acid, boron trifluoride etherate, zinc or manganese ions, acetic acid, carboxylic acid, sodium hydroxide, or salts, such as zinc acetate. The fluorinated polyurethane proppant coating may include from 1 to 70 wt. %, from 1 to 45 wt. %, from 1 to 20 wt. %, from 5 to 70 wt. %, from 5 to 45 wt. %, from 5 to 12 wt. %, from 12 to 70 wt. %, from 12 to 45 wt. %, from 12 to 20 wt. % accelerating agent as calculated by a weight of the proppant particles.

The coated proppants may be at least one of hydrophobic and oleophobic. In some embodiments, the fluorinated polyurethane proppant coating may have hydrophobic tendencies, such as a lack of attraction to water, repulsion to water, or immiscibility in water. The fluorinated polyurethane proppant coating may not substantially dissolve (does not dissolve more than 10 wt. % or more than 8 wt. %, or more than 5 wt. %, or more than 3 wt. %, or more than 1%) when contacted with, submerged in, or otherwise exposed to water. In some embodiments, the fluorinated polyurethane proppant coating may not dissociate from the proppant particle when the coated proppants are added to a water-based fluid, such as water or a fluid that includes water. Dissolution of the fluorinated polyurethane proppant coating in a fluid medium may be determined by any suitable analytical technique for detection of solvated coating material that is performed on a fluid medium to which coated proppants have been added and allowed to equilibrate at room temperature for at least 24 hours. The coated proppants may have a water contact angle of from 120° to 180°, of at least 70°, of at least 80°, of at least 90°, of at least 100°, of at least 110°, of at least 120°, of at least 150°, or of at least 180°. The contact angle may be measured in accordance with ASTM D7334-8(2013).

In some embodiments, the fluorinated polyurethane proppant coating may have oleophobic tendencies, such as a lack of attraction to hydrocarbons, repulsion to hydrocarbons, or immiscibility in hydrocarbons. The fluorinated polyurethane proppant coating may not substantially dissolve (does not dissolve more than 10 wt. % or more than 8 wt. %, or more than 5 wt. %, or more than 3 wt. %, or more than 1 wt. %) when contacted with, submerged in, or otherwise exposed to hydrocarbons. In some embodiments, the fluorinated polyurethane proppant coating may not dissociate from the proppant particle when the coated proppants are added to a hydrocarbon-based fluid, oil or gas. Dissolution of the fluorinated polyurethane proppant coating in a fluid medium may be determined by any suitable analytical technique for detection of solvated coating material that is performed on a fluid medium to which coated proppants have been added and allowed to equilibrate at room temperature for at least 24 hours. The coated proppants may have a condensate contact angle of from 40° to 70°, of from 50° to 70°, of from 50° to 60°, of from 120° to 180°, of at least 70°, 80°, 90°, 100°, 110°, 120°, 150°, or of 180°. The coated proppants may have a hydrocarbon contact angle of from 40° to 70°, of from 50° to 70°, of from 50° to 60°, of from 120° to 180°, of at least 70°, 80°, 90°, 100°, 110°, 120°, 150°, or of 180°.

Referring again to FIG. 1, in one or more embodiments, the proppant particle 100 may be coated with a fluorinated polyurethane proppant coating 110 during a coating step 200 to produce, form, or result in a coated proppant. In some embodiments, the fluorinated polyurethane proppant coating 110 may be a surface layer on or bound to the proppant particle 100. Such a surface layer may coat at least a portion of the surface of the proppant particle 100. The fluorinated polyurethane proppant coating 110 may coat the entire surface of the proppant particle 100 (as shown) or, alternatively, may only partially surround the proppant particle 100 (not shown), leaving at least a portion of surface of the proppant particle 100 uncoated or otherwise exposed. Also not shown, the fluorinated polyurethane proppant coating 110 may be the outermost coating of the proppant particle with one or more other intervening coatings positioned between the fluorinated polyurethane proppant coating 110 and the proppant particle 100. This means that in such an embodiment the fluorinated polyurethane proppant coating 110 is coupled to the proppant particle 100 as opposed to contacting the proppant particle 100 as shown in FIG. 1.

Further embodiments of the present disclosure are directed to methods for producing coated proppants with a fluorinated polyurethane proppant coating. The method includes forming the fluorinated polyurethane proppant coating by reacting at least one of diisocyanate and polyisocyanate, and at least one of aliphatic or aromatic fluorinated alcohols and fluorinated polyols. The reaction may optionally contain aliphatic or aromatic alcohols and polyols to control the hydrophobicity and oleophobicity of the coating. The method further includes coating proppant particles with the fluorinated polyurethane proppant coating to produce coated proppants with crosslinked fluorinated polyurethane proppant coating.

In some embodiments, the method may further include mixing the fluorinated polyurethane with resin to form a mixture; and coating the proppant particles with the mixture. The fluorinated polyurethane and resin may be uniformly distributed throughout the coating. The method for producing coated proppants may include coating the proppant particles using a two-layer coating or multi-layered coating system. The method may include coating the proppant particles with the resin, mixing the strengthening agent and the strengthening agent to form a mixture, and coating the proppant particles with the mixture. In another embodiment, the proppant particles may be coated with the resin prior to coating the proppant particles with the fluorinated polyurethane proppant coating. These layers may be of uniform thickness or may comprise changes in thickness throughout, leading to hierarchical roughness in the fluorinated polyurethane proppant coating. In some embodiments, the method may further include melting the resin prior to the coating step, in the case of a solid resin, such as novolac.

Forming the fluorinated polyurethane proppant coating may further comprise adding an amine solution comprising at least one of triethylenediamine, tetramethylethylenediamine, and hexamethylenediamine. The amine solution may comprise 1,6-hexamethylenediamine. In some embodiments, forming the fluorinated polyurethane proppant coating may further comprise reacting the at least one of diisocyanate and polyisocyanate and the at least one of aliphatic or aromatic fluorinated alcohols and fluorinated polyols with non-fluorinated polyols.

Coating the proppant particles may comprise mixing the proppant particles with the fluorinated polyurethane proppant coating. In other embodiments, coating the proppant particles with fluorinated polyurethane proppant coating comprises coating the proppant particles with from 1 to 10 wt. % fluorinated polyurethane proppant coating as calculated by a weight of the proppant particles.

Coating the proppant particles may also further comprise mixing the proppant particles, the fluorinated polyurethane proppant coating, and a surfactant to prevent clumping. The surfactant may be anionic, cationic, zwitterionic, or nonionic. The anionic surfactants may include at least one of sulfate esters, sulfonate esters, phosphate esters, and carboxylates. The nonionic surfactants may include at least one of ethoxylates, fatty acid esters of polyhydroxy compounds, amine oxides, sulfoxides, and phosphine oxides. The ethoxylates may include at least one of fatty alcohol ethoxylates, alkylphenol ethoxylates, fatty acid ethoxylates, ethoxylated fatter esters, ethoxylated oils, ethoxylated amines, fatty acid amides, and terminally blocked ethoxylates. The fatty acid esters of polyhydroxy compounds may include at least one of fatty acid esters of glycerol, fatty acid esters of sorbitol, fatty acid esters of sucrose, and alkyl polyglucosides.

The method may further include coating the proppants with at least one of a lubricating agent, a resin, a coupling agent, a crosslinker, an accelerating agent, and a strengthening agent comprising at least one of glass fibers, carbon fibers, Kevlar fibers, mica, silica, alumina, carbon nanotubes, nanosilica, nanoalumina, nanozinc oxide, nanotubes, nanocalcium carbonate, nanocalcium carbonate, and nanozirconium oxide. In other embodiments, the method includes coating proppant particles with a top coating. The top coating may be an overlying layer that may be added for additional properties or features. As a non-limiting example, additional coatings may be used in conjunction with, or may comprise, a breaker, asphaltene inhibitors, wax inhibitor, scale inhibitors, iron sulfide dissolvers, iron inhibitor, delayed acid generator, or combinations of these. As used throughout this disclosure, a "breaker" refers to a compound that may break or degrade the fracturing fluid after a fracturing operation to prevent subsurface formation damage. In some embodiments, the breaker may be an oxidizer or enzyme breaker. The breaker may be any suitable materials capable of degrading a coating material.

The method for producing coated proppants may include heating the proppant particles up to from 10° C. to 250° C., up to from 370° F. to 425° F., up to 50° F., up to 75° F., up to 100° F., up to 125° F., up to 150° F., up to 175° F., up to 200° F., up to 300° F., up to 350° F., up to 370° F., up to 400° F., up to 425° F., up to 450° F., or up to 500° F. prior to the coating step. The heating may include calcining by any suitable process such as by forced hot air heating, convection, friction, conduction, combustion, exothermic reactions, microwave heating, or infrared radiation, for example.

In some embodiments, the method may further comprise roughening the proppant particles before the coating step. The proppant particles may be chemically or physically roughened, as previously described.

In some embodiments, the coating step may include contacting the proppant particle with the mixture in a fluidized bed process. In some embodiments, the coating step may include a stationary, bubbling, circulation, or vibratory fluidized bed process. In some embodiments, the coating step may include spraying or saturating the proppant particles with the mixture. The coating step may include, in some embodiments, tumbling or agitating the coated proppants to prevent agglomeration or clumping. The coating step may include adding another compound to the mixture, such as a solvent, an initiator, an adhesion promoter, or an additive, to form the fluorinated polyurethane proppant coating. In some embodiments, the coating process may be conducted with an emulsion coating technique. In some embodiments, the adhesion promoter may comprise a silane (for example, amino silane) or a silane-containing monomer. In some embodiments, an adhesion promoter may not be necessary to coat the proppant particles.

A hydraulic fracturing fluid and a method for increasing a rate of hydrocarbon production from a subsurface formation is also disclosed. A hydraulic fracturing fluid may be used to propagate fractures within a subsurface formation and further open fractures. The hydraulic fracturing fluid may include water, a clay-based component, and the coated proppants disclosed in this disclosure. The clay-based component may include one or more components selected from the group consisting of lime (CaO), $CaCO_3$, bentonite, montmorillonite clay, barium sulfate (barite), hematite ($Fe_2O_3$), mullite ($3Al_2O_3.2SiO_2$ or $2Al_2O_3.SiO_2$), kaolin, ($Al_2Si_2O_5(OH)_4$ or kaolinite), alumina ($Al_2O_3$, or aluminum oxide), silicon carbide, tungsten carbide, or combinations thereof. Coated proppants within the hydraulic fracturing fluid may aid in treating subsurface fractures, to prop open and keep open the fracture. The method may include producing a first rate of production of hydrocarbons from the subsurface formation, in which the hydrocarbons comprise a first interfacial tension, introducing a hydraulic fracturing fluid comprising the coated proppants into the subsurface formation, in which the proppants reduce the first interfacial tension of the hydrocarbons to a second interfacial tension, thereby reducing condensate banking or water blockage near a wellbore, and increasing hydrocarbon production from the subsurface formation by producing a second rate of production of hydrocarbons from the subsurface formation, in which the second rate of production of hydrocarbons is greater than the first rate of production of hydrocarbons.

The hydraulic fracturing fluid in the subsurface fracture may comprise coated proppants suspended in the hydraulic fracturing fluid. In some embodiments, the coated proppants may be distributed throughout the hydraulic fracturing fluid. The coated proppants may not aggregate or otherwise coalesce within the subsurface formation, owing in part to the wettability characteristics of the fluorinated polyurethane proppant coating. The hydraulic fracturing fluid may be pumped into the subsurface formation or may be otherwise contacted with the subsurface formation.

Embodiments of methods of treating a subsurface formation may include propagating at least one subsurface fracture in the subsurface formation to treat the subsurface formation. In some embodiments, the subsurface formation may be a rock or shale subsurface formation. In some embodiments, contacting of the subsurface formation may include drilling into the subsurface formation and subsequently injecting the hydraulic fracturing fluid into at least one subsurface fracture in the subsurface formation. In some embodiments, the hydraulic fracturing fluid may be pressurized before being injected into the subsurface fracture in the subsurface formation.

EXAMPLE

The following example illustrates features of the present disclosure but is not intended to limit the scope of the disclosure.

COMPARATIVE EXAMPLE

A comparative example for a coating recipe not including fluorosulfonamide alcohol or poly-methylenediphenyldiisocyanate at a target mixing temperature of 200° F. is described in Table 1.

TABLE 1

| Steps to achieve a coated proppant. |
| --- |
| Coating Steps |
| 1  Add 100 g of uncoated proppant particles to a 100 ml beaker equipped with a mechanical stirrer and heat it to 200° F. |
| 2  Add 0.7 g of novolac resin over 60 second period and mix it to spread it evenly on the sand particles. |
| 3  Add 0.08 g silane coupling agent (3-glycidoxypropyltrimethoxysilane) to the mixing sand and stir for 10 seconds. |
| 4  Add 0.8 g of reactive amine (1,6-diaminohexane) catalyst over 15 seconds. |
| 5  Add 0.4 g of surfactant diluted in 1.8 g water and stir. |
| 6  Cool by adding small amount of water followed by discharging the coated proppants in the pan. |

Example 1

An example coating recipe at a target mixing temperature of 200° F. is described in Table 2.

TABLE 2

| Steps to achieve a coated proppant. |
| --- |
| Coating Steps |
| 1  Add 100 g of uncoated proppant particles to a 100 ml beaker equipped with a mechanical stirrer and heat it to 200° F. |
| 2  Add mixture of 0.2 g of fluoro sulfonamide alcohol (Fluorad ™ FC-10 produced by 3M ™) and 0.7 g of novolac resin over 60 second period and mix it to spread it evenly on the sand particles. |
| 3  Add 0.08 g silane coupling agent (3-glycidoxypropyltrimethoxysilane) to the mixing sand and stir for 10 seconds. |
| 4  Add 0.8 g of reactive amine (1,6-diaminohexane) catalyst over 15 seconds. |
| 5  Add 2.48 g of poly-methylenediphenyldiisocyanate having 31.5% N=C=O over a period of 60 seconds. |
| 6  Add 0.4 g of surfactant diluted in 1.8 g water and stir. |
| 7  Cool by adding small amount of water followed by discharging the coated proppants in the pan. |

Example 2

Another example coating recipe at a target mixing temperature of 200° F. is described in Table 3.

TABLE 3

| Steps to achieve a coated proppant. |
| --- |
| Coating Steps |
| 1  Add 100 g of uncoated proppant particles to a 100 ml beaker equipped with a mechanical stirrer and heat it to 200° F. |
| 2  Add mixture of 0.25 g of fluorosulfonamide alcohol (Fluorad ™ FC-10 produced by 3M ™) and 0.7 g of novolac resin over 60 second period and mix it to spread it evenly on the sand particles. |
| 3  Add 0.08 g silane coupling agent (3-glycidoxypropyltrimethoxysilane) to the mixing sand and stir for 10 seconds. |
| 4  Add 0.8 g of reactive amine (1,6-diaminohexane) catalyst over 15 seconds. |
| 5  Add 2.43 g of poly-methylenediphenyldiisocyanate having 31.5% N=C=O over a period of 60 seconds. |
| 6  Add 0.4 g of surfactant diluted in 1.8 g water and stir. |
| 7  Cool by adding small amount of water followed by discharging the coated proppants in the pan. |

Contact angle data for each of the Examples are shown in Table 4.

TABLE 4

| Contact angle data | | |
| --- | --- | --- |
| | Amount of Fluorosulfonamide alcohol present in coating (wt. %) | Water Contact Angle |
| Comparative Example | 0% | 76° |
| Example 1 | 5.6% | 99° |
| Example 2 | 7.1% | 107° |

The water contact angle was measured using the standard test method ASTM D-724. As shown in Table 4, Examples 1 and 2, which include fluorosulfonamide alcohol in the coating, unlike the Comparative Example, have a greater water contact angle than the Comparative Example. Additionally, Example 2 includes 7.1 wt. % fluorosulfonamide alcohol by weight of the proppant coating, whereas Example 1 includes 5.6 wt. % fluorosulfonamide alcohol by weight of the proppant coating. Therefore, Example 2 has a greater water contact angle than Example 1, due to the greater weight percent of fluorosulfonamide alcohol within the proppant coating.

It should be apparent to those skilled in the art that various modifications and variations may be made to the embodiments described within without departing from the spirit and scope of the claimed subject matter. Thus, it is intended that the specification cover the modifications and variations of the various embodiments described within provided such modification and variations come within the scope of the appended claims and their equivalents.

Having described the subject matter of the present disclosure in detail and by reference to specific embodiments thereof, it is noted that the various details disclosed within should not be taken to imply that these details relate to elements that are essential components of the various embodiments described within, even in cases where a particular element is illustrated in each of the drawings that accompany the present description. Further, it should be apparent that modifications and variations are possible without departing from the scope of the present disclosure, including, but not limited to, embodiments defined in the appended claims. More specifically, although some aspects of the present disclosure are identified as particularly advantageous, it is contemplated that the present disclosure is not necessarily limited to these aspects.

What is claimed is:

1. A coated proppant comprising:
    a proppant particle comprising sand, ceramic material, or combinations thereof; and
    a fluorinated polyurethane proppant coating on the proppant particle, in which
        the fluorinated polyurethane proppant coating is a polymerized reaction product of:
            at least one of diisocyanate and polyisocyanate, and
            at least one of aliphatic or aromatic fluorinated alcohols and fluorinated polyols;
        the fluorinated polyurethane proppant coating comprises fluorosulfonamide;
        the water contact angle of the fluorinated polyurethane proppant coating is between 80° and 180°; and
        the fluorinated polyurethane proppant coating further comprises from 1 to 15 wt. % of a strengthening agent comprising at least one of glass fibers, carbon fibers, Kevlar fibers, mica, silica, alumina, carbon nanotubes, nanosilica, nanoalumina, nanozinc oxide, nanotubes, nanocalcium carbonate, nanocalcium carbonate, and nanozirconium oxide.

2. The coated proppant of claim 1, in which the coated proppant comprises from 1 to 10 wt. % fluorinated polyurethane proppant coating as calculated by a weight of the proppant particles.

3. The coated proppant of claim 1, in which the coated proppant has a glass transition temperature of at least 150° F.

4. The coated proppant of claim 1, in which the fluorinated alcohols comprise fluorosulfonamide alcohols.

5. The coated proppant of claim 4, wherein the fluorinated polyurethane proppant coating comprises at least 5.6 wt. % fluorosulfonamide alcohol.

6. The coated proppant of claim 1, in which the fluorinated polyols comprise 1,2-propanediol-3-(N-ethyl perfluorooctanesulfonamide); 1,5-hexanediol-6-(N-ethyl perfluorooctanesulfonamide); 1,2-propanediol-3-(N-propyl perfluoroethane sulfonamide); 1,2-propanediol-2-(N-ethyl perfluorododecanesulfonamide); 1,5-hexanediol-6-(N-ethyl perfluorobutylcyclohexanesulfonamide); 1,2,3-butanetriol-4-(N-ethyl perfluorooctanesulfonamide), or combinations thereof.

7. The coated proppant of claim 1, in which the at least one of diisocyanate and polyisocyanate comprise methylene diphenyl diisocyanate, toluene diisocyanate, hexamethylene diisocyanate, isophorone diisocyanate, methyl isocyanate, toluene-2,4-diisocyanate, 1,5 naphthalene diisocyanate, diphenylmethane-2,4-diisocyanate, diphenylmethane-2,2-diisocyanate, bis(isocyanatemethyl)cyclohexane, 1,3-bis(isocyanatemethyl)cyclohexane, 1,4-bis(isocyanatemethyl)cyclohexane, ethylene diisocyanate and 1,12-dodecane diisocyanate, or combinations thereof.

8. The coated proppant of claim 1, in which the polyisocyanate comprises diphenylmethane-2,2-diisocyanate.

9. The coated proppant of claim 1, in which the fluorinated polyurethane proppant coating further comprises at least one of a lubricating agent, a resin, a coupling agent, a crosslinker, and a surfactant.

10. The coated proppant of claim 9, in which the resin comprises at least one of phenol, furan, epoxy, urethane, phenol-formaldehyde, polyester, vinyl ester, and urea aldehyde.

11. The coated proppant of claim 1, in which the fluorinated polyurethane proppant coating is a polymerized reaction product of:
the at least one of diisocyanate and polyisocyanate,
the at least one of aliphatic or aromatic fluorinated alcohols and fluorinated polyols, and
at least one of non-fluorinated alcohol and non-fluorinated polyols.

12. A method for producing coated proppants with a fluorinated polyurethane proppant coating, the method comprising:
forming the fluorinated polyurethane proppant coating by reacting:
at least one of diisocyanate and polyisocyanate, and
at least one of aliphatic or aromatic fluorinated alcohols and fluorinated polyols; and
coating proppant particles with the fluorinated polyurethane proppant coating to produce proppants with fluorinated polyurethane proppant coating;
wherein the fluorinated polyurethane proppant coating comprises fluorosulfonamide,
wherein the fluorinated polyurethane proppant coating further comprises from 1 to 15 wt. % of a strengthening agent comprising at least one of glass fibers, carbon fibers, Kevlar fibers, mica, silica, alumina, carbon nanotubes, nanosilica, nanoalumina, nanozinc oxide, nanotubes, nanocalcium carbonate, nanocalcium carbonate, and nanozirconium oxide, and
wherein the water contact angle of the fluorinated polyurethane proppant coating is between 80° and 180°.

13. The method of claim 12, in which forming the fluorinated polyurethane proppant coating further comprises adding an amine solution comprising at least one of triethylenediamine, tetramethylethylenediamine, and hexamethylenediamine.

14. The method of claim 12, in which forming the fluorinated polyurethane proppant coating further comprises reacting the at least one of diisocyanate and polyisocyanate and the at least one of fluorinated alcohols and fluorinated polyols with non-fluorinated polyols.

15. The method of claim 12, in which coating the proppant particles with fluorinated polyurethane proppant coating comprises coating the proppant particles with from 1 to 10 wt. % fluorinated polyurethane proppant coating as calculated by a weight of the proppant particles.

16. The method of claim 12, further comprising heating the proppant particles up to from 10° C. to 250° C. before coating the proppant particles.

17. The method of claim 12, in which coating the proppant particles further comprises mixing the proppant particles, the fluorinated polyurethane proppant coating, and a surfactant to prevent clumping.

18. The method of claim 12, in which the fluorinated polyols comprise 1,2-propanediol-3-(N-ethyl perfluorooctanesulfonamide); 1,5-hexanediol-6-(N-ethyl perfluorooctanesulfonamide); 1,2-propanediol-3-(N-propyl perfluoroethane sulfonamide); 1,2-propanediol-2-(N-ethyl perfluorododecanesulfonamide); 1,5-hexanediol-6-(N-ethyl perfluorobutylcyclohexanesulfonamide); 1,2,3-butanetriol-4-(N-ethyl perfluorooctanesulfonamide), or combinations thereof.

19. The method of claim 12, in which the at least one of diisocyanate and polyisocyanate comprise methylene diphenyl diisocyanate, toluene diisocyanate, hexamethylene diisocyanate, isophorone diisocyanate, methyl isocyanate, toluene-2,4-diisocyanate, 1,5 naphthalene diisocyanate, diphenylmethane-2,4-diisocyanate, diphenylmethane-2,2-diisocyanate, bis(isocyanatemethyl)cyclohexane, 1,3-bis(isocyanatemethyl)cyclohexane, 1,4-bis(isocyanatemethyl)cyclohexane, ethylene diisocyanate and 1,12-dodecane diisocyanate, or combinations thereof.

20. The method of claim 12, further comprising coating the proppants with at least one of a lubricating agent, a resin, a coupling agent, and a crosslinker.

21. The coated proppant of claim 12, in which the fluorinated polyurethane proppant coating is a polymerized reaction product of:
the at least one of diisocyanate and polyisocyanate, and
the at least one of aliphatic or aromatic fluorinated alcohols and fluorinated polyols, and
at least one of non-fluorinated alcohol and non-fluorinated polyols.

22. A method for increasing a rate of hydrocarbon production from a subsurface formation, the method comprising:
producing a first rate of production of hydrocarbons from the subsurface formation through a wellbore, in which the hydrocarbons comprise a first interfacial tension;
introducing a hydraulic fracturing fluid comprising a plurality of the proppants of claim 1 into the subsurface formation, in which the proppants reduce the first interfacial tension of the hydrocarbons to a second interfacial tension, thereby reducing at least one of condensate banking and water blockage near the wellbore; and increasing hydrocarbon production from the subsurface formation by producing a second rate of production of hydrocarbons from the subsurface formation, in which the second rate of production of hydrocarbons is greater than the first rate of production of hydrocarbons.

* * * * *